United States Patent [19]

Cavelos

[11] 4,204,211

[45] May 20, 1980

[54] CONTROLLABLE SATURATION SIDELOBE CANCELLER

[75] Inventor: Arthur A. Cavelos, North Syracuse, N.Y.

[73] Assignee: General Electric Company, Syracuse, N.Y.

[21] Appl. No.: 482,078

[22] Filed: Jun. 24, 1974

[51] Int. Cl.² ............................................... G01S 3/06
[52] U.S. Cl. .................................. 343/100 LE; 375/99
[58] Field of Search .................. 343/100 LE, 100 CL, 343/18 E; 325/371, 473

[56] References Cited

U.S. PATENT DOCUMENTS

| | | | |
|---|---|---|---|
| 3,202,990 | 8/1965 | Howells | 343/100 CL |
| 3,737,783 | 6/1973 | Oswald et al. | 325/371 |
| 3,763,490 | 10/1973 | Hadley et al. | 343/100 LE |

Primary Examiner—Maynard R. Wilbur
Assistant Examiner—Richard E. Berger
Attorney, Agent, or Firm—Carl W. Baker; Richard V. Lang

[57] ABSTRACT

An intermediate frequency sidelobe canceller with provision for controlling the saturation level of the cancellation loop. Such control is provided by interposition of limiter means at a particular point in the cancellation loop, and it enables the setting or programming of the loop cancellation time constant as desired. It significantly enhances performance and reduces cost of the canceller loop by reducing substantially the signal power levels within the loop and by making the loop transient response essentially constant over a wide range of input power level.

3 Claims, 3 Drawing Figures

CONTROLLABLE SATURATION SIDELOBE CANCELLER

BACKGROUND OF THE INVENTION

This invention relates to signal processors for radar, sonar and like signal reception systems, and more particularly to sidelobe cancellation circuits for control of jamming, interference and other noise in such systems.

Still more particularly, the present invention constitutes a refinement of the basic intermediate frequency sidelobe canceller circuit disclosed and claimed in U.S. Pat. No. 3,202,990, which issued 24 Aug. 1965 to Paul W. Howells and is assigned to the assignee of the present application. The basic canceller loop of this Howells patent has proven to be effective against a variety of jamming and other interference sources, and it has been sucessfully and extensively used in many signal processor applications in both single loop and multiple loop versions as described in the patent. A modification of the basic multiple loop canceller is disclosed and claimed in the copending application of Kovarik, Howells and Applebaum, Ser. No. 165,259, filed Jan. 9, 1962, also of common assignment, now U.S. Pat. No. 4,044,359.

Cancellation loop saturation control in accordance with the present invention affords significant enhancement of capabilities of sidelobe cancellers of the kind described in these earlier filed cases. Controllability of loop saturation level affords also greater adaptability and thus potentially greater applicability of such cancellers particularly under operation conditions in which difficulties might otherwise be anticipated and, in accordance with the invention, these improvements are accomplished by addition of only relatively very simple and low cost circuit elements to otherwise conventional sidelobe cancellers.

SUMMARY OF THE INVENTION

In carrying out the invention in its presently preferred embodiments, a single or multiple loop sidelobe canceller of the general configuration of Howells U.S. Pat. No. 3,202,990 has interposed in the cancellation loop, at a particular point therein, a limiter element which controls in predetermined manner the saturation level of the loop. Preferably, this limiter may comprise one or more diode quads the characteristics of which are such as to permit the cancellation loop to operate linerally up to a preselected signal amplitude or power level, at which level the limiter saturates and keeps the signal power level at that point in the circuit essentially constant. If desired, controllability or programmability of loop saturation level may readily be accomplished by a provision of means for varying the diode bias current to enable change or programming of the loop cancellation time constant as desired.

The addition of this limiter, which is interposed in the leg of the cancellation loop through which the cancellation residue signal is fed back to the cross-correlation mixer, enables positive and flexible control of the cancellation loop time constant, as well as control of the relationship between the cancellation time constant and signal strength within the loop. By proper selection and control of the limiter, signal power levels within the cancellation loop are reduced and the cancellation time constant controlled, while preserving such other desired characteristics of the basic canceller as proportionality of steady state canceller gain to jamming signal power level.

BRIEF DESCRIPTION OF THE DRAWING

These and other objects, features and advantages of the invention will be further understood by reference to the following description when taken in conjunction with the accompanying drawings, wherein.

DESCRIPTION OF THE PREFERRED EMBODIMENT

Figures 1, 2, 3:
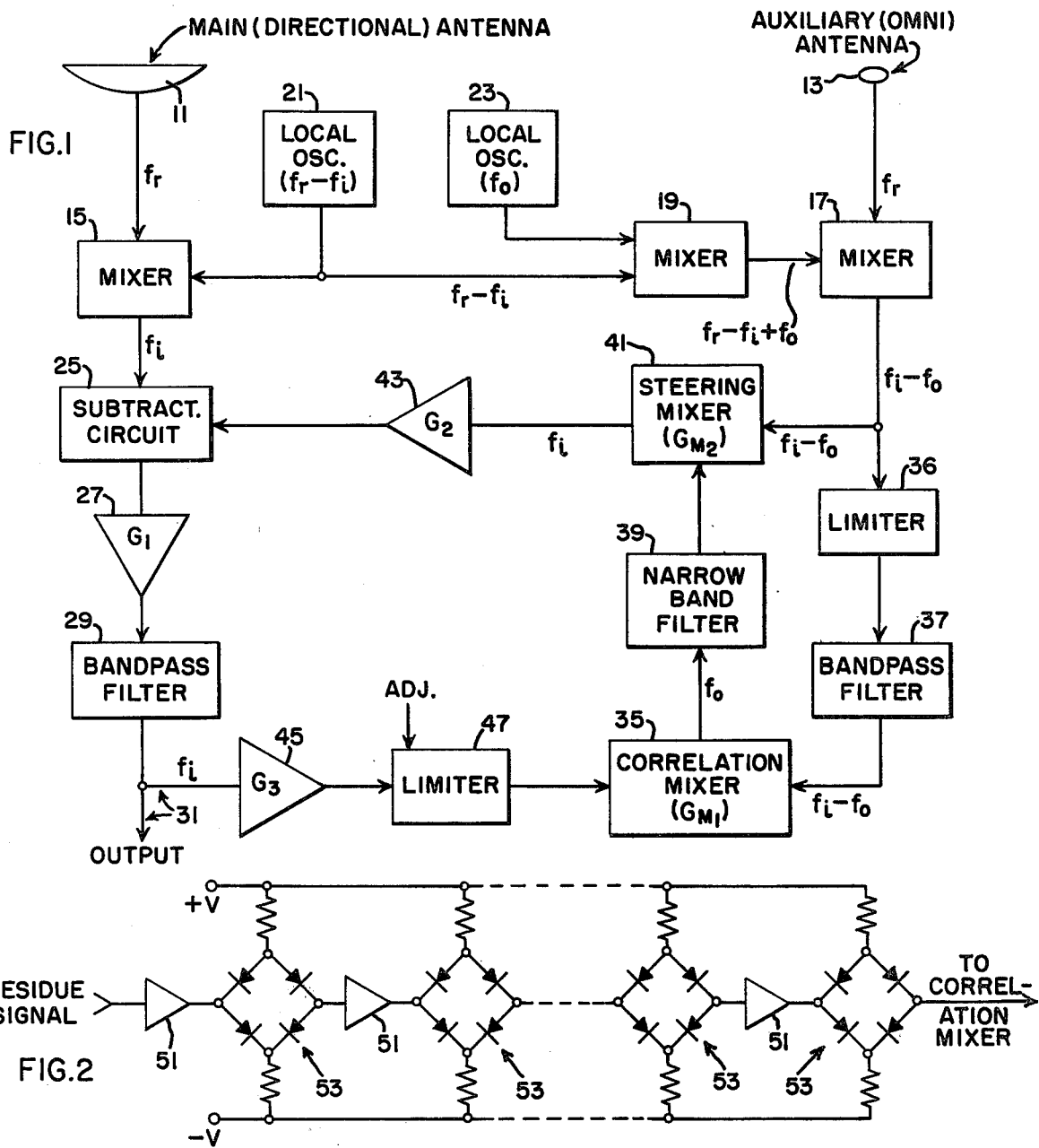
FIG. 1 is a block diagram of a sidelobe cancellation circuit incorporating loop saturation control in accordance with the invention.
FIG. 2 illustrates a preferred form of diode quad limiter and amplifier combination for use in the circuit of FIG. 1.
FIG. 3 illustrates operating characteristics of a sidelobe canceller with and without loop saturation control in accordance with the invention.

With continued reference to the drawings, FIG. 1 illustrates a sidelobe cancellation circuit similar in general configuration to the aforementioned Howells - U.S. Pat. No. 3,202,990 patent but affording controllable saturation in accordance with the present invention. As shown, the cancellation loop comprises main and auxiliary channels to which the respective signal inputs are provided by a directional antenna 11 and an omnidirectional antenna 13, the latter preferably being located in close proximity to the main or directional antenna. The basic function of the canceller loop is to cancel, from the signal as received by the main antenna, any jamming signal content received through a sidelobe of that antenna. This is desirable because even though the antenna sidelobes may be many decibels down from the mainlobe, the very high power levels which are typical of jamming and other interference signals may still be troublesome when introduced through an antenna sidelobe. The lower levels of desired signals, such as target reflections in the case of a radar system, often are so much lower than inteference signal power levels that the higher gain of the antenna mainlobe as compared to its sidelobes is insufficient to enable detection of a mainlobe target signal masked by sidelobe interference.

To accomplish cancellation of such sidelobe interference in accordance with the teachings of the Howells patent the main and omni antenna signals which are both at radio frequency ($f_r$) are reduced to intermediate frequency by first mixers 15 and 17, respectively, to which the local oscillator inputs are offset by a frequency $f_0$. This may be accomplished as illustrated by mixing, at 19, the outputs of two local oscillators 21 and 23 the latter of which introduces the desired offset frequency.

The main channel signal, which may include both mainlobe target signal content and sidelobe interference or noise signal content at the IF frequency $f_i$, is applied as one input to a subtraction circuit 25. The other input to this circuit is a correction or cancellation signal derived as hereinafter explained from the auxiliary channel signal. Circuit 25 subtracts the latter signal from the former in conventional manner. The product of this subtraction, with amplification at 27 and bandpass filtering at 29, represents the desired or target signal from which any jamming signal content has been substantially wholly cancelled, and it becomes the main channel output at 31 as indicated.

For generating the correction or cancellation signal to be applied to subtraction circuit 25, the cancellation loop comprises correlation means for comparing the auxiliary channel signal, in which it will be recalled the jamming signal is of relatively high power level as compared to any target or other desired signal content, and the loop output signal at 31 which contains the desired or target signal plus any residual jamming signal component not cancelled in the subtraction circuit 25. These signals are compared in a correlation mixer 35, to which the auxiliary channel signal is supplied through a limiter 36 and bandpass filter 37.

If correspondence is found between these two signal inputs to the correlation mixer 35, as will be the case if there is any residue of the jamming signal remaining in the canceller output at 31, this will give rise to a correlation signal output from mixer 35. This signal, after narrowband filtering at 39, is applied to a steering mixer 41 which has as its second input the auxiliary channel signal and which forms part of a compensating cross feed network providing as output the correction signal to subtraction circuit 25. In mixer 41 the auxiliary channel signal combines with the correlation signal to yield this correction or cancellation signal, which is of the same frequency $f_i$ as that of the main channel signal at the point of subtraction in circuit 25. Amplifiers 27, 43 and 45 may be provided in the cancellation loop in the positions indicated for purposes of maintaining desired signal levels within the loop.

Further detail on circuit parameters and component selection in a sidelobe canceller of the kind just described will be found in the aforementioned Howells patent, together with an analysis of the operation of the cancellation loop in terms of the mathematical relations between signals which are input to the loop and signals generated within the loop. Since these relations are complex and full description of them necessarily lengthy, reference is made to Howells - U.S. Pat. No. 3,202,990 for such analysis and detailed description, and only the general principles of operation of the circuit will be summarized here.

In brief, sidelobe cancellers of the configuration just described function in the general manner of closed loop servo systems wherein the error signal is constituted by any residue or uncancelled jamming signal which remains in the main channel output, the presence of such jamming signal residue being sensed by correlation, in mixer 35, with the jamming signal as present in the auxiliary channel input to that mixer. Whenever such error or residue is sensed, the correlation mixer output as subsequently filtered and combined with the compensating cross feed network operates to generate a correction or cancellation signal which is of phase and amplitude such that when subtracted at 25 from the main channel signal the residue or uncancelled signal then is reduced thereby. The loop will continue to thus respond to any residual error and, after a lock-on period which is the duration determined primarily by the loop time constant and which in radar applications typically may be of the order of a few microseconds, will reduce the interference signal residue to near zero.

As described in the aforementioned Howells patent the operation of this cancellation loop is such that its gain inherently is high with respect to high average power signals, as typically is the case with jamming and other purposeful interference signals, but the gain is low with respect to low average power signals and canceller operation accordingly does not significantly degrade the performance of the radar or other system with which used, in the absence of jamming or interference. As also described in the Howells patent and the Kovarik et al application, it is entirely feasible to extend the basic cancellation loop so as to be effective against multiple jammers by utilizing additional omni antennas and additional loops with their combined outputs and inputs respectively connected into the subtraction circuit 25 and main channel output 31 in the same manner as in the loop shown.

In accordance with the present invention, operation of the basic sidelobe canceller circuit just described may for many applications be significantly improved by the simple addition of an overload limiter 47 interposed at a particular point in the canceller loop, specifically, in the feedback leg of the loop through which the cancellation residue signal is applied to the correlation mixer 35. With this limiter 47 and its associated amplifier in place as shown in FIG. 1, the loop will continue to operate in essentially linear manner just as before, whenever the cancellation residue signal is at levels below that at which the limiter commences limiting, but for residue signal levels above this limiting value the signal input to the correlation mixer is held constant.

The effect is to reduce substantially the maximum transient levels of signals as applied to the correlation mixer as well as of signals elsewhere within the canceller loop. Also, and as will be shown, operation of the limiter seves to obviate the interdependence which otherwise exists between the loop time constant and loop gain, and thus is helpful in stabilizing loop operation at high jamming signal levels.

Considering more specifically now the operation of the cancellation loop with this amplifier-limiter combination incorporated within the loop, the total loop gain is the product of the gains ($G_1 \times G_2 \times G_3$) of the three amplifiers 27, 43, and 45, respectively, times the gains ($G_{m1}$ and $G_{m2}$) of the two mixers 41 and 35. Since the gain $G_{m1}$ of mixer 35 is held constant by operation of the limiter 36, and the gain $G_{m2}$ of mixer 41 is proportional of $J_a$ where $J_a$ is the auxiliary channel signal magnitude, total loop gain is $$G = G_1 \times G_2 \times G_3 \times G_{m1} \times G_{m2} = K \times J_a$$

Assuming there is no saturation of any of the loop elements so that their respective gains all are constant with the exception of $G_{m2}$, which as previously noted is a function of jamming signal strength, the total loop gain will be the same for both steady state and transients, and will determine both the loop cancellation ratio and the loop time constant, i.e., the loop transient response. It can be shown that the loop cancellation ratio is directly proportional to loop gain and accordingly increases linearly with $J_a$, which as previously noted is a desirable characteristic. However, the loop time constant decreases in inverse relation with loop gain, at a rate determined by the slope of the filters included in the loop, and this is generally not a desirable characteristic since the lock-on time becomes a variable.

With introduction of the overload limiter 47 adjusted as previously explained so that it limits only during transients and does not affect steady state conditions, the combined gain of the amplifier and limiter combination 45-47 at steady state remains the same (i.e., still equal to $G_3$). Under steady state conditions the gain then will be, as before, $$G = G_1 \times G_2 \times G_3 \times G_{m1} \times G_{m2} = K \times J_a$$

However, with large residue signals as may occur during transient conditions, the limiter 47 saturates and its output then becomes and remains a constant. If the level of this limiter output is adjusted so as to be just equal to the input to amplifier 45 at the beginning of the transient, the gain $G_3$ of the combination then becomes unity and the loop gain at the beginning of such transients is:

$$G_0 = G_1 \times G_2 \times G_{m1} \times G_{m20} = K_0$$

If signal levels are now increased F times, the initial input to amplifier 45 increases but since the amplifier-limiter is held constant by action of the limiter, the gain $G_3$ of the amplifier-limiter combination effectively decreases by this factor F. Simultaneously, $G_{m2}$ will increase by the same factor F, reflecting the higher level of signal input to the mixer 41.

The initial saturation gain of the loop remains constant under these conditions as indicated by the relation:

$$G_{sat} = G_1 \times G_2 \times 1/F \times G_{m1} \times G_{m20} \times F = K_0$$

from which the factor F cancels leaving the gain a constant ($K_0$) and independent of signal strength. In other words, the initial saturated gain remains of the same value ($K_0$) as at the point at which the limiter first becomes effective.

As the transient progresses the level of the residue decreases but as long as this level is sufficient to achieve limiting the circuit behaves like an open loop with constant input (step function) and the transients in the two cases described above are identical until the residue drops to less than the amount necessary to limit. As shown in FIG. 3, in which loop time constant is plotted against jamming signal strength (normalized to dB below an assumed full jamming level), the controllable saturation loop compares very favorably with the performance of a conventional loop in terms of transient response. A further advantage peviously mentioned is the capability to adjust the level at which the limiter 47 operates, which permits programming of the loop gain as desired. Thus if the limiter is adjusted to become effective at lower level the initial gain of the loop will be diminished by the same differential. The curve labeled "saturated" in FIG. 3 then will move up correspondingly and will extend further to the right. That is the point at which the limiter stops limiting.

For operation of the canceller loop in accordance with the invention, the amplifier 45 must be highly linear. By way of exmple, in a representative embodiment of the invention the amplifier may be requied to provide linear gain of 33 dB and to operate with very low input signal level of perhaps −38 dBm. Also, the input to the correlation mixer from the amplifier-limiter should not be higher than say −5dBm irrespective of jamming signal level.

While these performace requirements all could be met by single-stage amplifier and limiter divices, it may in the present state of the art be more economical to implement these circuit elements as shown in FIG. 2. As there illustrated, a series string of amplifier stages 51 has its adjacent stages separated by diode quad limiter stages 53. Such series string of amplifier-limiter stages may readily and economically be fabricated in integrated circuit form with the elements arranged on a common substrate in known manner.

For the exemplary embodiment being described, the individual amplifier stages may be designed to operate without distortion and with good linearity down to the −38 dBm specified, and the quads 53 designed to operate linearly with an 8 dB loss to a maximum input level of 4 dBm. For higher input levels the quads limit their outputs to −4 dB with negligible phase shift. Each of the amplifier stages except the first operates with 14 dB gain, the first at 17 dB. with these values of quad limiter loss and amplifier gain it will be seen that each of the components within the amplifier-limiter chain can be kept within the design specifications, that the desired linear gain of the combination at 33 dB is attained, and that the input to the correlation mixer is at the desired −5 dBm.

This arrangement affords the further advantage that it enables very precise control of the signal level at which the limiter comprised by the several diode quads saturates, simply by adjustment of the diode bias current supply. In this way the limit value may be controlled or programmed, automatically or otherwise, to optimize canceller operation under different conditions.

The controllable saturation loop of this invention also is advantageous in operation when there is input to the auxiliary channel from two or more simultaneous jammers. Under these conditions the limter 47 will reach saturation and commence limiting in response to the greatest of the jamming signals and will decrease the effective gain $G_3$ of the amplifier-limiter combination by the factor F just as before. This reduction in $G_3$ follows the behavior of a variable attenuator, i.e., it will attenuate both jamming signals by the same ratio. As a result, the reduced $G_3$ will be the same for both jammers and the loop will behave like a conventional loop with gains reduced by F. Thus the loop gain will still be higher for the large jammer than for the small jammer, due to $G_{m2}$ being proportional to $J_a$, and the loop accordingly will continue to afford the desired preferential cancellation of the larger jammer.

What is claimed as new and desired to be secured by Letters Patent of the United States is:

1. In a canceller:
   (a) a main signal transmission channel having an output terminal and an input terminal coupled to receive a signal which may include both desired and undesired signal content;
   (b) an auxiliary signal transmission channel coupled to receive a signal including primarily said undesired signal;
   (c) cross correlaton means connected to the output terminal of said main signal transmission channel and to said auxiliary signal transmission channel for detecting the relative amplitude and phase of said main and auxiliary channel signals and generating a correlation signal indicative of the result of such correlation, said cross correlation means including an overload limiter interposed in the connection to said main signal transmission channel for limiting the amplitude of said main channel signal as applied therethrough for correlation with said auxiliary channel signal;
   (d) a compensating cross feed network coupled to said auxiliary signal transmission channel to receive said undesired signal and to said cross correlation means to receive said correlation signal, said cross feed network being responsive to the signals coupled thereto to generate a correction signal of amplitude and phase corresponding to the undesired signal content of the main signal transmission channel as applied through said correlation limiter; and (e) means interposed between said main channel input and output terminals for subtracting said correction signal from said main channel signal thereby to reduce the undesired signal content thereof.

2. A noise canceller as defined in claim 1 wherein said limiter comprises a saturable element including means for adjusting a signal level at which saturation occurs.

3. A noise canceller as defined in claim 2 wherein said saturable element includes one or more diode quads and means for controlling the diode bias current.

* * * * *